Nov. 2, 1965  G. E. HERTIG ETAL  3,215,897
UNITARY MOUNTING ASSEMBLY FOR OUTDOOR SWITCHING STATION
Filed May 28, 1962  6 Sheets-Sheet 1

INVENTORS
GERALD E. HERTIG
J. FRED BURHENN
BY
OSTROLENK, FABER, GERB & SOFFEN
ATTORNEYS

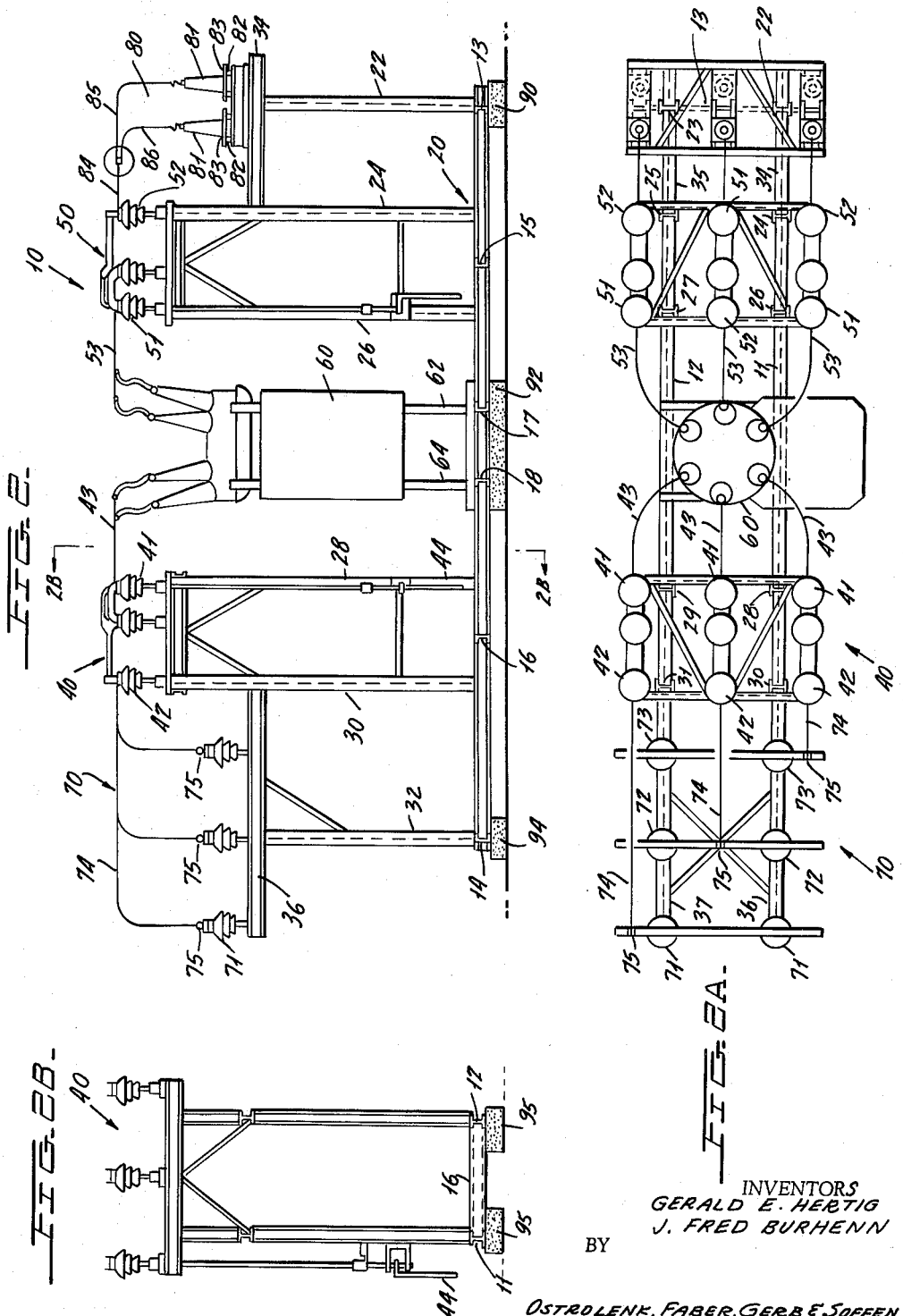

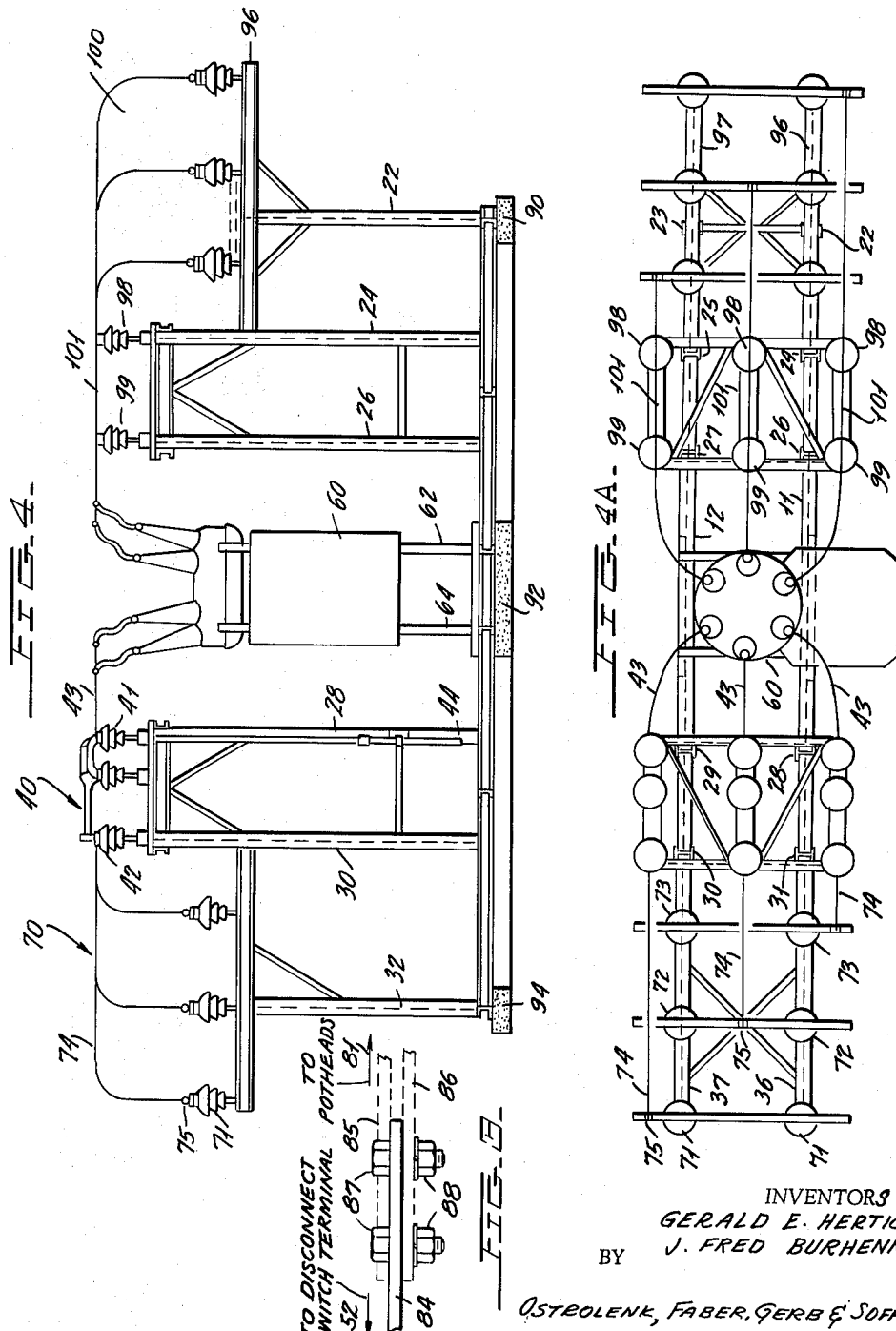

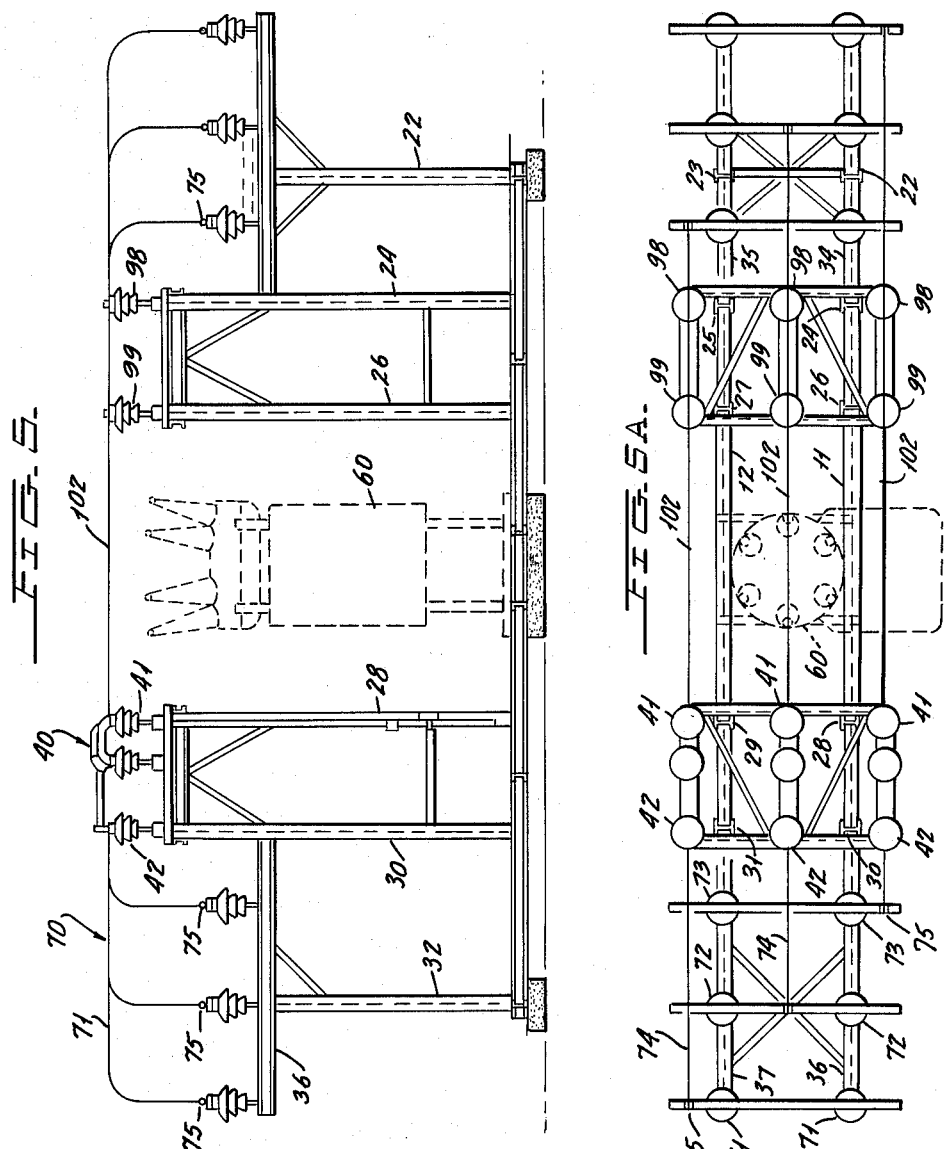

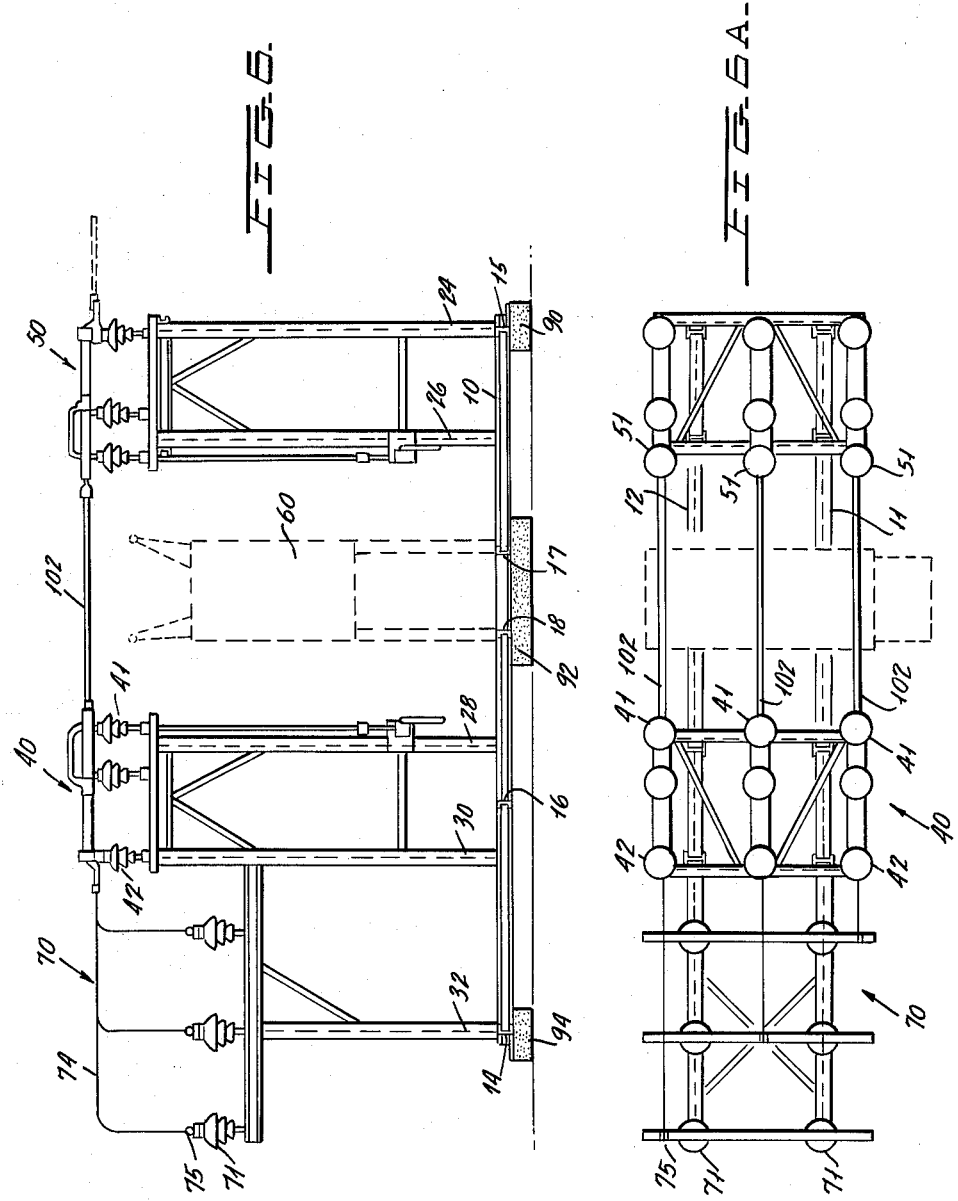

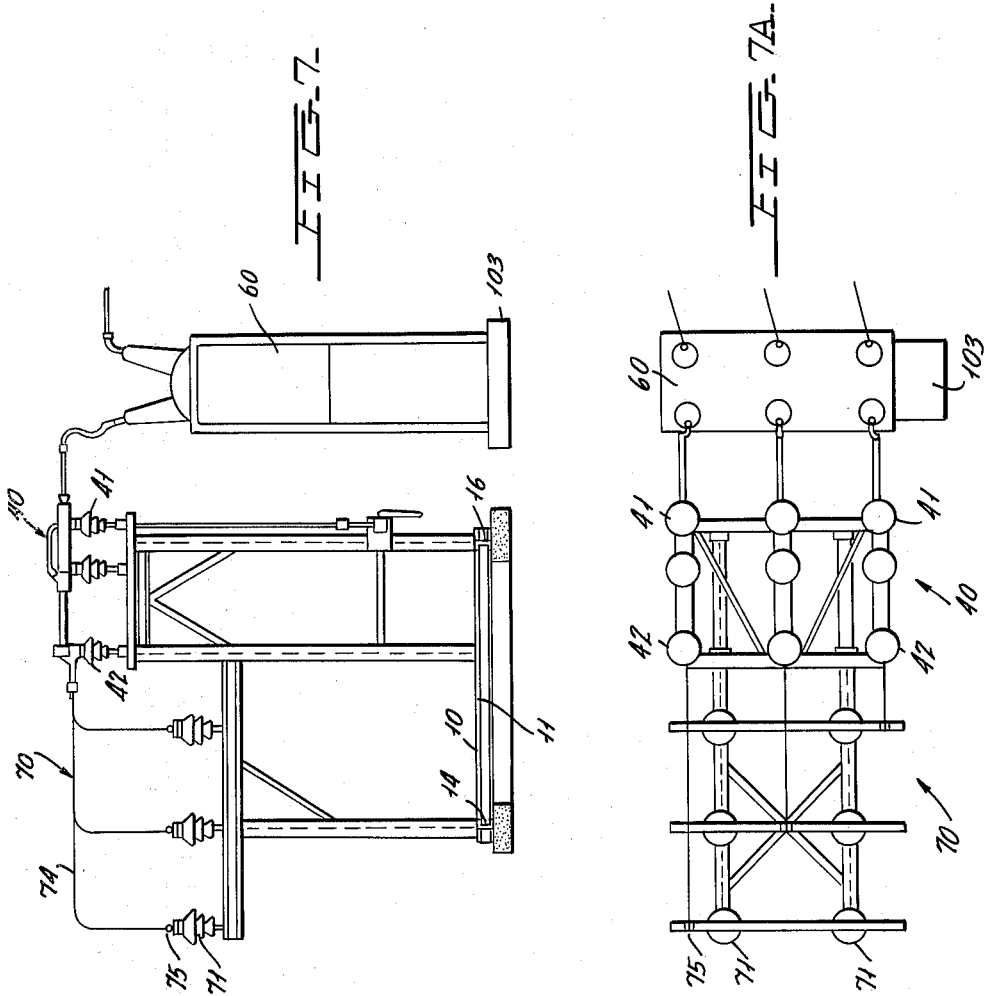

3,215,897
UNITARY MOUNTING ASSEMBLY FOR
OUTDOOR SWITCHING STATION
Gerald E. Hertig, Jeannette, and John Fred Burhenn,
Greensburg, Pa., assignors to I-T-E Circuit Breaker
Company, Philadelphia, Pa., a corporation of Pennsylvania
Filed May 28, 1962, Ser. No. 198,209
2 Claims. (Cl. 317—103)

Our invention relates to a substation structure and more particularly to an outdoor electrical substation of a unitary assembly which may be completely factory engineered and assembled for shipment and installation at a remote site.

Within that part of the electrical industry that pertains to the generation, transmission and distribution of electrical energy, it is well known to provide outdoor substation installations to perform the required system operational and protective functions. Such outdoor substations normally include a grouping or assembly of a variety of electrical equipment mounted to a support structure. The electrical equipment is designed for outdoor use and typically include such components as: switching means, such as air break disconnect switches; conducting means, such as buses, potheads and interconnecting cables; power circuit breakers; and the necessary supporting insulators and fittings to mount the electrical equipment to the support structure.

Heretofore it has been the practice of electrical utilities to acquire and the manufacturer to fabricate and ship the individual equipment components and structural members for outdoor substations separately. In addition, the erection of the support structures, the assembly and mounting of the air-break switches, the assembly of the buses, potheads, fittings and insulators and the placing into position of power circuit breakers have been performed at the substation site. The obvious disadvantage of such a procedure is the necessity of receiving and inventorying many shipments and individual pieces of equipment, the need for organizing and training especially knowledgeable construction crews, and the allowance for the interim between the receipt of equipment and scheduled in-service dates for construction time; all of which, in addition to the field erections required, is generally very costly.

Another arrangement of the prior art is to assemble the required electrical equipment such as switches, buses and power circuit breakers within sheet metal enclosures; such assemblies being commonly termed "metal-clad" or "metal-enclosed" substations. Inasmuch as such enclosed assemblies normally use indoor type of equipment, the enclosure must be weatherproofed or weather-tight. Thus such a structure does not conform to the definition of outdoor substations utilizing all outdoor type of equipment.

Our invention provides a system wherein all of the members are included in a unitary assembly completely factory engineered and fabricated for installation at the outdoor substation site. In the illustrative embodiments of our invention, the support structure is constructed of a common base frame having a plurality of upright members rigidly connected thereto and extending therefrom. These upright members are operatively positioned and adapted to receive the electrical equipment of the particular substation installation. The equipment is preferably mounted to the structure in a manner which permits easy removal at the site for maintenance or modification of the system.

Inasmuch as various combinations of equipment are normally employed at the numerous outdoor substations of a complete distribution system, typical substations constructed in accordance with the teachings of our invention are shown, each containing a somewhat different arrangement of equipment.

In the particular illustrative embodiments of our invention, three phase outdoor substations are shown. It is naturally understood that the same system concept of a unitary factory assembled outdoor substation structure may be employed in other multiple phase or single phase substation designs.

In one such preferred embodiment a power circuit breaker is centrally located on the longitudinally positioned base frame of the support structure. Upright girders on either side of the power circuit breaker contain insulator supported disconnect switch assemblies, which are operatively connected to the power circuit breaker. Upright girders adjacent one of the disconnect switch assemblies contain an insulator supported bus assembly, operatively connected to that disconnect switch assembly. Upright girders adjacent the other disconnect switch assembly contain a pothead assembly, connected to that disconnect switch assembly. The complete substation assembly including the potheads and insulator supports is completely factory assembled and shipped as a unit to the installation site.

In another illustrative embodiment of an outdoor substation constructed in accordance with the teachings of our invention, the pothead assembly of the previous embodiment has been removed and the support structure modified to receive a second bus assembly at that location.

In a further modification of the basic assembly, the power circuit breaker has been deleted, but provision retained to permit future installations thereof.

In another modification of the basic assembly, the potheads (or bus connectors) on one of the sides have been removed, and the base frame shortened accordingly.

In an additional modification of the basic assembly, the base frame has been shortened to contain only a disconnect switch and a bus assembly. The disconnect switch is operatively positioned to be connected to a power circuit breaker which may be directly bolted to the substation foundation.

It is thus seen that the basic concept of our invention resides in an outdoor substation construction including a series of unitary structural elements upon which are mounted a variety of outdoor type substation equipments, such as air break disconnect switches, buses, potheads, circuit breakers and support insulators. These structural elements are completely factory fabricated and assembled with the electrical equipment mounted thereon for shipment and installation as a unit at the outdoor substation site.

It is therefore a primary object of our invention to provide an outdoor substation unitary assembly which may be completely factory engineered and fabricated for shipment and installation at a remote site.

Another object of this invention is to provide a substation design wherein a variety of electrical equipment is mounted to a plurality of upright members attached to the common base frame.

An additional object of this invention is to provide an electrical outdoor substation design wherein a variety of electrical equipment is mounted to a support structure comprising a common base frame and a plurality of upright support means rigidly connected to the base frame, said support structure being characterized as being movable as a unit with the electrical equipment supported thereon.

Still another object of this invention is to provide a series of unitary outdoor substation assemblies, each containing a common base member which may be adapted to have a plurality of upright members secured thereto, said upright members being operatively positioned to contain a variety of outdoor type electrical substation equipment.

Still a further object of this invention is to provide a support structure for an outdoor electrical substation wherein the support structure may be adapted to contain various arrangements of electrical equipment and is characterized as being movable as a unit therewith to the substation installation site.

Still an additional object of this invention is to provide a unitary outdoor substation design to contain electrically connected switching means, conducting means and circuit breaker means and their necessary insulator supports, and movable as a unit therewith to the substation installation site.

These and other objects of my invention will readily become apparent after reading the following description of the accompanying drawings in which:

FIGURES 2, 2a and 2b are side elevation, plan and end views respectively of the outdoor substation construction shown in FIGURE 1.

FIGURE 3 illustrates an exemplary pothead to disconnect switch connection which may be used in conjunction with our invention.

FIGURES 4 and 4a are a side and elevation view respectively of a modification to the outdoor substation assembly shown in FIGURE 1, in which a second bus assembly replaces the pothead assembly, and one of the disconnect switch assemblies have been removed.

FIGURES 5 and 5a are side elevation, and plan views respectively of a further modification of FIGURES 4 and 4a, wherein the power circuit breaker has been removed but provision retained for installation thereof as a future item of equipment.

FIGURES 6 and 6a are side elevation and plan views respectively of another modification of the basic outdoor substation assembly, wherein neither a bus assembly or pothead assembly is required on one side, and the base framing has been correspondingly shortened.

Figure 1:
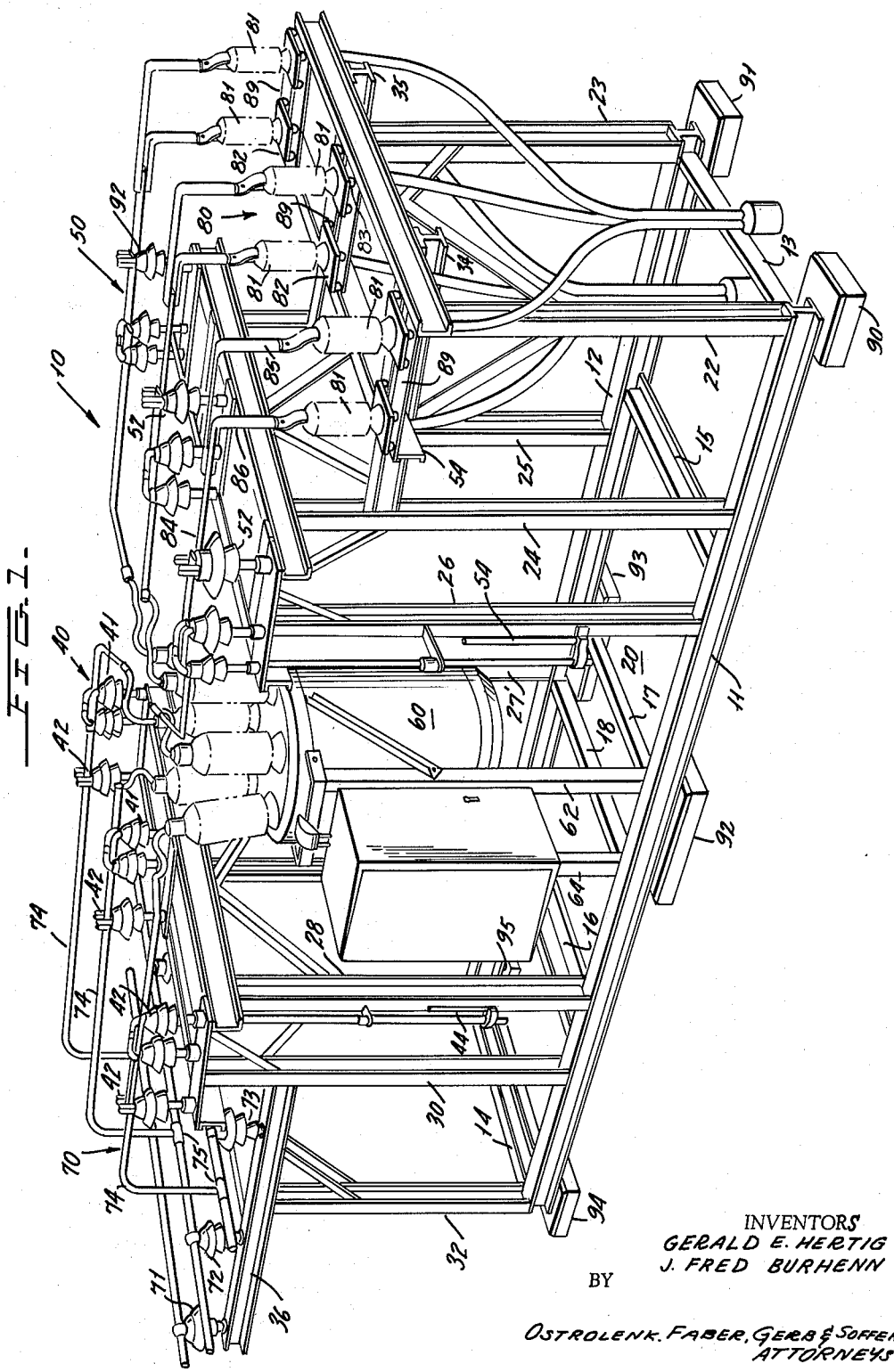
FIGURE 1 is a perspective view of a three-phase outdoor substation constructed in accordance with the teachings of our invention, in which a power circuit breaker is centrally disposed between a pair of disconnect switch assemblies, which in turn are adjacent a bus assembly and pothead assembly.

FIGURES 7 and 7a are side elevation and plan views respectively of an additional modification of the basic outdoor substation assembly, wherein the base framing has been further shortened to accommodate a particular assembly which only requires a disconnect switch assembly and a bus assembly. A power circuit breaker may be directly mounted to the substation assembly adjacent the disconnect switch assembly.

Although 34,500 volt three-phase embodiments have been chosen to illustrate our invention, it is naturally understood that our basic system concept may likewise be employed in other multiple phase, or in a single phase design of various other ratings.

Reference is intially made to FIGURES 1–2b, which show a unitary outdoor substation 10 containing a power circuit breaker 60; a pair of air-break disconnect switch assemblies 40, 50; a bus assembly 70; and a pothead assembly 80. All of these members are operatively connected to common base 20 which is shown constructed of longitudinally extending members 11 and 12 which are connected together by a plurality of cross-girders 13–18 to form a rigid structure. A plurality of upright support members 22–33 are attached to longitudinal girders 11, 12 and operatively positioned to contain the requisite outdoor electrical equipment for the particular substation construction. The support structure further includes longitudinally extending members 34–37 connected to particular pairs of the aforementioned upright supports to provide a support structure for bus assembly 70 and pothead assembly 80. The aforementioned members comprising the support structure are preferably constructed of steel or aluminum which may be alternatively bolted or welded, in the manner well known in the art, to form a rigid support structure. Ground anchors 90–95 secure unitary substation 10 to its foundation.

The central portion of the support structure provides an area adapted to contain power circuit breaker 60, which may typically be a 34.5 kv., 1200 ampere 1500 mva. oil circuit breaker, constructed in the manner well known in the art. Power circuit breaker 60 is preferably connected to upright members 62–65, which in turn are bolted to longitudinal members 11, 12, in a manner designed to carry the reaction from the circuit breaker operation to the foundation. The bolted connection of circuit breaker 60 to the support structure facilitates the replacement or installation of a circuit breaker to a substation assembly as a future item of equipment, in the manner more fully discussed below in conjunction with FIGURES 5 and 6.

Upright support members 28–31 adjacent the left side of circuit breaker 60 are operatively positioned to support air-break disconnect switch assembly 40. A similar set of upright support members 24–27 are positioned to support air-break disconnect switch assembly 50. Disconnect switch assemblies 40, 50 may typically be three-pole ganged assemblies, having a continuous rating of 1200 amperes, and a momentary rating of 61,000 amperes, manually operable by handles 44, 54. Connectors 43 and 53 connect terminals 41 and 51 of disconnect switch assemblies 40 and 50 respectively to the appropriate terminals of power circuit breaker 60.

The left extremity of outdoor substation assembly 10 contains vertical upright members 32, 33 to which are attached longitudinal supporting members 36, 37 operatively positioned, in conjunction with uprights 30, 31, to support three phase bus assembly 70. Bus assembly 70 is connected to supports 36, 37 via insulator support pairs 71–73, one for each phase, as best shown in FIGURE 2a. Conductors 74 operatively connect the individual phase buses of bus assembly 70 to appropriate terminal 42 of disconnect switch assembly 40. T connector 75 connects the individual phase conductors 74 to their appropriate bus bar of bus assembly 70.

The right extremity of outdoor substation assembly 10 contains vertical upright members 22, 23, to which are attached longitudinal supporting members 34, 35, operatively positioned, in conjunction with uprights 24, 25, to support pothead assembly 80. Pothead assembly 80 may be of any outdoor type well known in the art designed for 34,500 volt operation. Individual potheads 81 are directly connected to isolation insulators 82. Insulators 82 are bolted at 83, to cross members 89, which in turn are secured to longitudinally extending support members 34, 35. The bolted engagement of pothead assembly 80 to the substation support yields a preferred mounting which facilitates removal in the field for maintenance or to permit appropriate equipment modification to meet changing system requirements.

Connectors 84, 85, 86 interconnect the individual phase potheads 81 to terminals 52 of disconnect switch assembly 50, as shown in FIGURE 3, which typically illustrates such a connection. Connector pairs 85, 86 are directly connected to potheads 81. Conductors 84 are directly connected to disconnect switch terminals 52. Bolt and nut assemblies 87, 88 typically four in number, rigidly interconnect conductors 84 to conductors 85 and 86.

In a typical installation, conductors 84, 85, 86 and connectors 43, 53 and 74 may be 2 inch IPS aluminum pipe. Alternatively, conductors 84, 85, 86 may be ¼ inch by 4 inch aluminum bars.

It is thus seen that outdoor substation 10 is a unitary assembly supported by a common structure. The complete assembly containing all the necessary operating equipment, including supports and insulators, is fabricated at the factory under controlled conditions and the entire assembly then shipped to the site.

It is naturally understood that various modifications may be made to the basic unitary assembly shown in FIGURES 1–2b to comply with the particular electrical requirements of a particular outdoor substation and a few such modifications are discussed below.

FIGURES 4 and 4a are side elevation and plan views respectively of one such modification, wherein pothead assembly 80 and air-break disconnect switch assembly 50 have been removed. Longitudinally extending support members 34, 35 have been replaced with a further extending support member 96, 97 adapted to support a bus assembly 100, similar to bus assembly 70. Upright members 24–27 now support insulator pairs 98, 99 which are interconnected by conductors 101, to connect bus assembly 100 to the appropriate terminals of circuit breaker 60. Longitudinal supports 96, 97 are constructed to be easily adapted for supporting a pothead assembly, such as 80 as shown in FIGURE 2.

FIGURES 5 and 5a are side elevation and plan views respectively of a further modification of the unitary assembly of FIGURES 4 and 4a, wherein power circuit breaker 60 is removed, but access is retained for its installation as a future item of equipment. Conductors 102 replace conductors 43 and 53 to directly interconnect disconnect switch terminals 41 to terminals 99.

FIGURES 6 and 6a depict another embodiment of the basic structure shown in FIGURES 1 and 2, wherein the right-hand pothead or bus assembly receiving portion of the support structure has been removed. Longitudinal base girders 11, 12 have shortened accordingly. Access is shown for the installation of power circuit breaker 60 as a future item of equipment.

An additional modification of the unitary assembly contructed in accordance with the teachings of our invention is shown in FIGURES 7 and 7a, wherein the base support structure 10 is further shortened to contain disconnect switch assembly 40 and bus assembly 70 only. Power circuit breaker 60 is now shown as directly secured to the substation foundation at 103.

It is thus seen that our invention provides a variety of unitary outdoor substation structures wherein all the necessary electrical equipment is mounted thereto in the factory and the completely fabricated system is shipped to an installation site for assembly thereat. Specifically, we have illustrated our invention with five different outdoor substation arrangements. It is naturally understood that the basic concept of our invention may be utilized to provide a variety of other substation arrangements. Thus, we prefer not to be bound by the specific disclosure contained herein but only by the appended claims.

The invention in which a particular privilege or property is claimed is defined as follows:

1. In an electrical outdoor substation including electrically serially connected switching means, power circuit breaker means, and conductor means; the improvement comprising a unitary support structure constructed to receive, support, and have movable therewith said switching means, conductor means and said power circuit breaker; said support structure comprising a common base frame having first and second pluralities of upright support means rigidly connected to said base frame at first and second longitudinal portions thereof respectively and being on opposite sides of said power circuit breaker means; said base frame having a generally rectangular shape and including first and second longitudinal girders along oppositely extending sides thereof and a plurality of cross girders rigidly connecting said first and second girders; said base frame having means for mounting said base frame at ground level; said first and second pluralities of upright support means each comprising a plurality of pairs of parallel aligned upright girders rigidly connected to each of said first and second longitudinal girders at their first and second longitudinal portions respectively thereof; the longitudinal distance between the upright girders of two of the plurality of pairs of each of the plurality of upright support means being selected to contain said switching means, a third of the plurality of pairs of each of the plurality of upright support means further including a pair of horizontal girders connecting said third of the plurality of pairs with one of said two of the plurality of pairs; said pair of horizontal girders receiving said conductor means.

2. The apparatus of claim 1 wherein a third longitudinal portion of said first and second longitudinal girders is located between said first and second longitudinal portions and receives said power circuit breaker.

References Cited by the Examiner
UNITED STATES PATENTS

| | | | |
|---|---|---|---|
| 1,778,854 | 10/30 | Green | 189—1 |
| 1,884,580 | 10/32 | Corneliussen | 317—103 |
| 1,930,156 | 10/33 | Blomquist | 317—103 |
| 1,944,661 | 1/34 | Kalwitz | 317—103 |
| 2,288,650 | 7/42 | Rossman | 317—103 |
| 2,379,188 | 6/45 | Rugg | 317—103 |

OTHER REFERENCES

Electric World, "Inexpensive 11-kv. Outdoor Substation," C. E. Schnell, pp. 451–3, September 3, 1927.

General Electric Bulletin 47706B, "Outdoor Station Equipment," June 1923, pp. 83–86.

General Electric Review, "Recent Trends in Substation Design," S. B. Fornham, November 1945, pp. 15 to 24.

JOHN F. BURNS, *Primary Examiner.*